(12) United States Patent
Chen

(10) Patent No.: US 7,431,250 B2
(45) Date of Patent: Oct. 7, 2008

(54) FIXTURE FOR A COMMUNICATION DEVICE

(75) Inventor: Jeong-Shion Chen, Taipei Hsien (TW)

(73) Assignee: Supa Technology Co., Ltd., Taipei Hsien (TW)

( * ) Notice: Subject to any disclaimer, the term of this patent is extended or adjusted under 35 U.S.C. 154(b) by 232 days.

(21) Appl. No.: 11/287,429

(22) Filed: Nov. 28, 2005

(65) Prior Publication Data

US 2007/0120026 A1    May 31, 2007

(51) Int. Cl.
*A45D 42/14*    (2006.01)
(52) U.S. Cl. .................. 248/205.5; 248/206.2
(58) Field of Classification Search .......... 248/205.5, 248/205.6, 205.7, 205.8, 205.9, 206.1, 206.2, 248/206.3, 309.3, 363
See application file for complete search history.

(56) References Cited

U.S. PATENT DOCUMENTS

| | | | | |
|---|---|---|---|---|
| 5,185,744 A | * | 2/1993 | Arimoto et al. | 714/719 |
| 6,234,435 B1 | * | 5/2001 | Yeh | 248/205.5 |
| 6,749,160 B1 | * | 6/2004 | Richter | 248/206.2 |
| 6,966,530 B2 | * | 11/2005 | Hsu | 248/206.2 |
| 7,007,908 B2 | * | 3/2006 | Tsay | 248/309.3 |
| 7,021,593 B1 | * | 4/2006 | Fan | 248/206.2 |
| D533,174 S | * | 12/2006 | Richter | D14/251 |

* cited by examiner

*Primary Examiner*—Brian Glessner
*Assistant Examiner*—Todd M. Epps
(74) *Attorney, Agent, or Firm*—Bacon & Thomas, PLLC

(57) ABSTRACT

A fixture for holding a communication device includes a conical base having an axle, a disk movably connected to the conical base, a disk lifting assembly mounted at a joint between the conical base and the hollow axle to lift the center of the disk so as to create vacuum inside the disk to enable the disk to securely adhere a surface, a rod movably engaged with the hollow axle and composed of two halves, each half having first annular teeth formed on an inner face of a top portion of the half and a pivoting head pivotally sandwiched between the two halves of the rod for holding thereon the communication device.

7 Claims, 7 Drawing Sheets

FIXTURE FOR A COMMUNICATION DEVICE

BACKGROUND OF THE INVENTION

1. Field of the Invention

The present invention relates to a fixture, and more particularly to a fixture adapted for a communication device to allow the communication device to be positioned on the fixture and adjusted to an appropriate position for easy access by the user.

2. Description of Related Art

Nowadays various communication devices facilitate our everyday life. The most common communication devices are such as cell phones, personal digital assistant (PDA), global positioning system (GPS) and the like. With different communication devices in different situations, the user is able to have the most updated information as required. When using these communication devices, the user normally has a stand to support the communication device. However, the conventional stand can not be adjusted or can only be adjusted within a limited angle such that the user will have trouble reaching the communication device.

To overcome the aforementioned disadvantages, the present invention provides an improved fixture to allow the user to easily have access to the communication device.

Other objects, advantages and novel features of the invention will become more apparent from the following detailed description when taken in conjunction with the accompanying drawings

SUMMARY OF THE INVENTION

The primary objective of the present invention is to provide an improved fixture for a communication device. The fixture has a base and a disk connected to the conical base and a center of the disk is movable relative to a base so that vacuum is generated after the center of the disk is moved toward the conical base and thus the disk is able to securely adhere to a surface.

Another objective of the present invention is that the fixture has a disk lifting assembly provided to an axle extending upward from the conical base to lift the center of the disk. The disk lifting assembly includes a knob pivotally mounted around the hollow axle and having a pair of positioning cutouts oppositely defined in and inclined relative to a peripheral edge of the knob to movably receive therein a pull element which is connected to the center of the disk such that when the knob is pivoted to allow the pull element to move along the opposite positioning cutouts, the up and downward movement of the pull element ascend and descend the center of the disk.

Yet another objective of the present invention is that the fixture further has a pivoting head pivotally connected to a rod which is movably connected to the hollow axle of the conical base. The pivoting head has a platform formed on a face of the pivoting head for clamping a communication device such that after the communication device is securely mounted on top of the platform, the user is able to pivot the pivoting head to adjust the communication device to a suitable angle for easy access to the communication device and to adjust relative height of the rod relative to the hollow axle to allow the user to easily reach the communication device.

Other objects, advantages and novel features of the invention will become more apparent from the following detailed description when taken in conjunction with the accompanying drawings.

DETAILED DESCRIPTION OF PREFERRED EMBODIMENT

Figure 1:
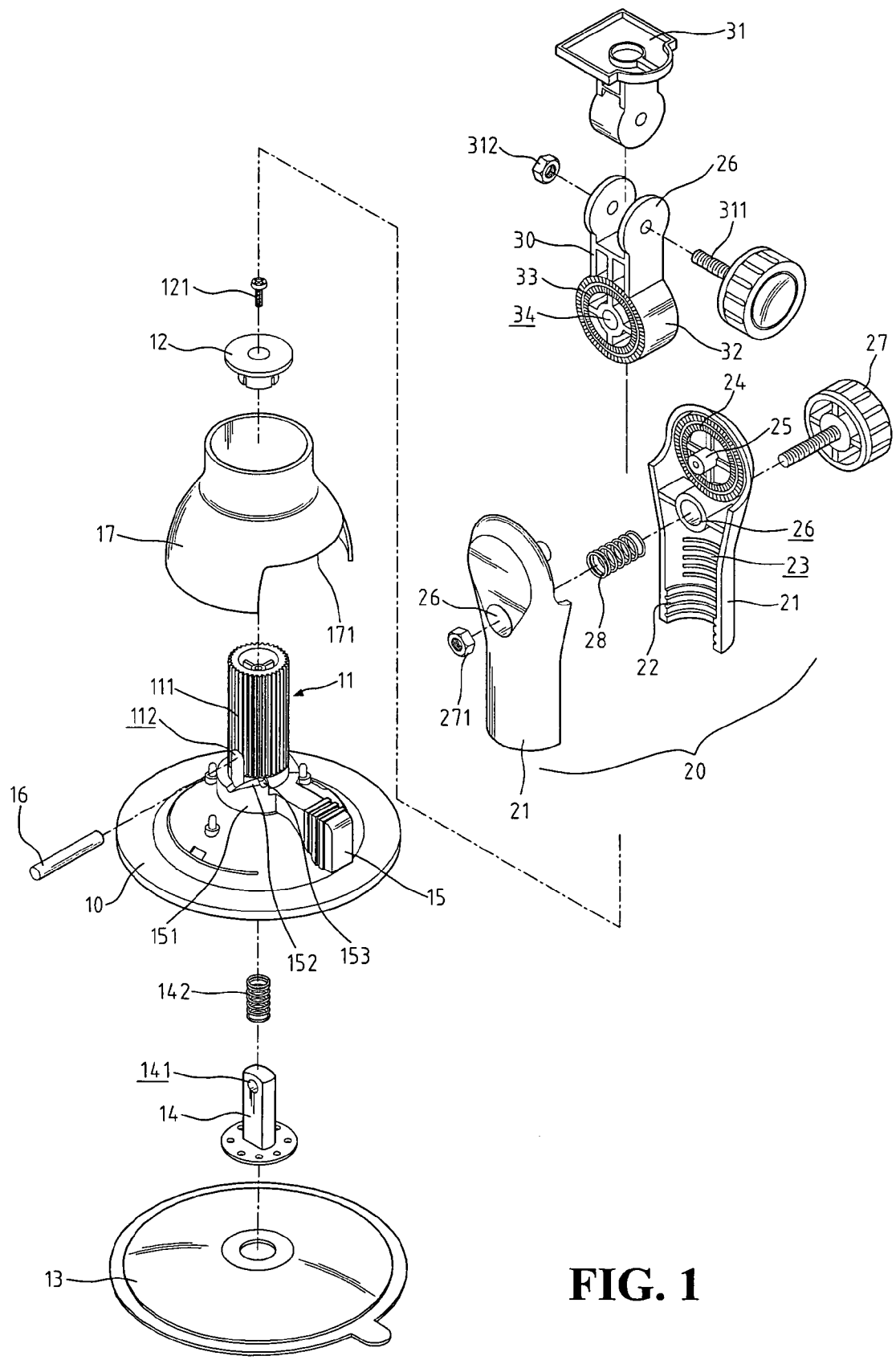
FIG. 1 is an exploded perspective view of the fixture of the present invention.
Figure 2:
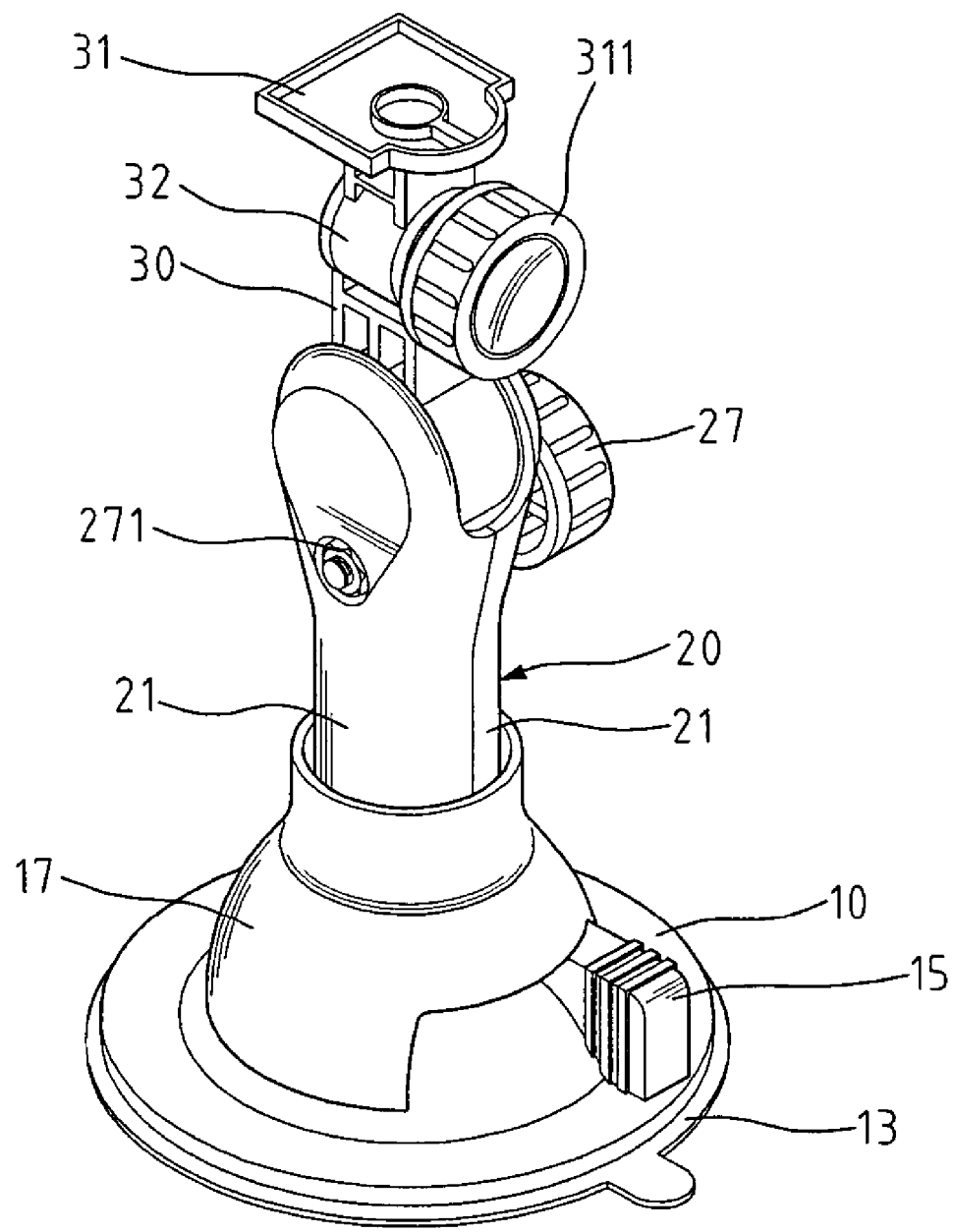
FIG. 2 is a perspective view showing the assembled fixture of the present invention.

With reference to FIGS. 1 and 2, a fixture constructed in accordance with the present invention includes a conical base 10, a rod 20 and a pivoting head 30.

It is to be noted that the conical base 10 has a hollow axle 11, with two open ends, extending upward from a face of the conical base 10 and provided with multiple ribs 111 extending longitudinally in an outer periphery of the hollow axle 11 and an elongated hole 112 defined in a joint between a bottom portion of the hollow axle 11 and the conical base 10. A disk lifting assembly comprising a disk 13 made of a resilient element is provided at the bottom of the conical base 10 and includes an extension 14 mounted on top of the disk 13 and having a first hole 141 defined through an upper portion of the extension 14. A first spring 142 is provided on top of the extension 14 and is received together with the extension 14 in the bottom open end of the hollow axle 11 to allow the first hole 141 to align with the elongated hole 112. Furthermore, a ring 151 having a knob 15 being formed together and thereby complete an integral one-piece body which is provided to allow the hollow axle 11 to be extended into the ring 151. The ring 151 has a pair of oppositely defined cutouts 152 formed in and inclined to a peripheral edge of the ring 151 and a pair of positioning recesses 153 defined in highest position in the cutouts 152. Thus a pull element 16, preferably a pin being mounted through the first hole (141) of the extension and the pull element 16 is able to extend through the aligned elongated hole 112 and the first hole 141 to securely connect the disk 13 to the conical base 10. The pull element 16 has a length slightly larger than a diameter of the hollow axle 11 so that two ends of the pull element 16 are able to be seated on the cutouts 152. With the provision of the pull element 16 and the extension 14, the first spring 142 is mounted on the top end of the extension 14. As a consequence of rotating the knob 15 to cause the ring to rotate therewith, the pull element 16 is moved along the cutouts 152 from a lowest position to a highest position on the cutouts 152. When a user push the knob 15 with a finger, the push element will move or roll along the inclination surface of the cutouts 152, thus cause the pull element 16 to move upward along the elongated hole 112 vertically, therefore, the pull element will pull the extension 14 upward, which results in that a center of the disk 13 is also lifted.

Thus vacuum is generated inside the disk 13 after the disk 13 is placed on a smooth surface and the conical base 10 is able to be securely attached to the surface.

In addition, a hollow enclosure 17, with two open ends, is provided to enclose the joint between the ring 151 and the conical base 10. The enclosure 17 further has a limiting cutout 171 defined in a periphery of the enclosure 17 to correspond to and receive therein the knob 15 such that the knob 15 is able to freely move inside the limiting cutout 171. A cap 12 is provided to close the top open end of the hollow axle 11 via a first bolt 121 threadingly extending through the cap 12 and into the hollow axle 11 to prevent contamination of the interior of the hollow axle 11.

The rod 20 of the fixture of the present invention is composed of two halves 21 being combined together by connecting elements including second bolt 27, second spring 28 and nut 27, the two halves each having therein multiple latitudinal ribs 22 formed on an inner face of each of the halves 21, slits 23 defined in the inner face of each of the halves 21, first annular teeth 24 formed on a top portion of each of the halves 21, a pole 25 extending out from a center of the first annular teeth 24 to align with each other and a second through hole 26 in each of the halves 21 of the rod 20 to correspond to a second bolt 27. Therefore, it is expected to see that when the rod 20 is assembled, the second bolt 27 is extended through the second through holes 26 of each of the halves 21 with a second spring 28 mounted around the second bolt 27 to connect to a nut 271. After assembly of the rod 20, the two poles 25 are connected to each other.

The pivoting head 30 of the present invention includes a head 32 pivotally connected between the two halves 21 of the rod and a seat 31 securely engaged with the head 32. The head 32 has second annular teeth 33 formed on two opposed side faces thereof to correspond to first annular teeth 24 of the rod 20, a third through hole 34 defined in a center of the second annular teeth 33 to correspond to the pole 25 of the rod 20 and two wings 26 extending upward from the head 32 to be parallel to one another. When the pivoting head 30 is to be assembled with the rod 20, the third through hole 34 is aligned with the poles 25 of the two halves 21 of the rod 20 so that when the two halves 21 of the rod 20 are combined via the second bolt 27, the poles 25 are extended into the third through hole 34 of the head 32 to sandwich the head 32 between the two halves 21 of the rod 20 and to mate the first annular teeth 24 with the second annular teeth 33. Thereafter, after the extension of the second bolt 27 into the second through hole 26 to combine the two halves 21 of the rod 20, the head 32 is securely sandwiched between the two halves 21 of the rod 20. In addition, the seat 31 is sandwiched between the two wings (26) via the third bolt 311 and the nut 312 which extending through the wings 26 and the seat 31. After the seat 31 is securely connected to the head 32, the user is able to secure the communication device on top of the seat 31. The securing device for securing the communication device is not the focus of the present invention, such that detailed description thereof is omitted hereinafter.

Figure 3:
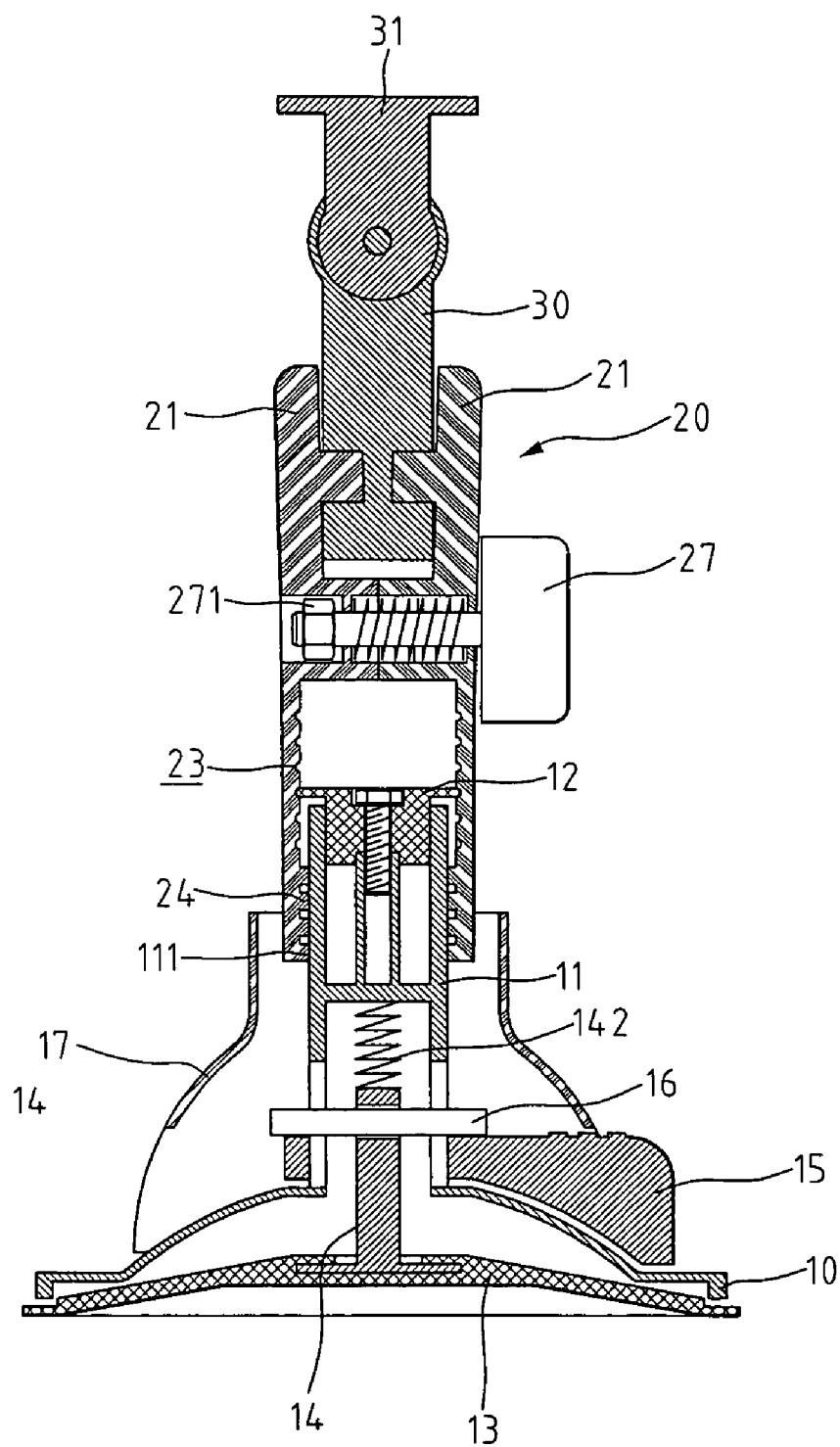
FIG. 3 is a cross sectional schematic view showing the internal structure of the fixture after assembly.
Figure 4A:
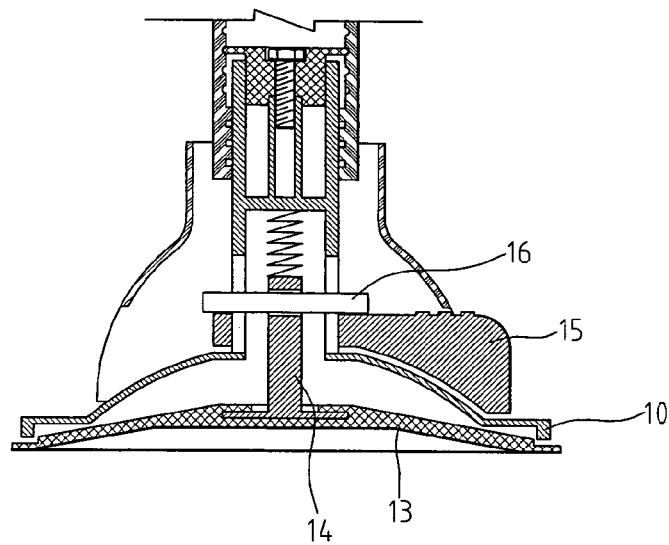
FIGS. 4A and 4B are cross sectional views showing the movement of the disk as a result of the driving of the disk lifting assembly.
Figure 4B:
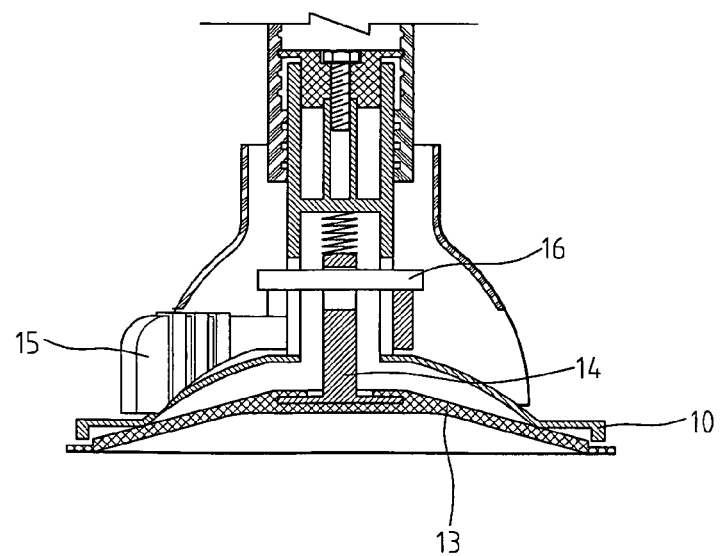

With reference to FIGS. 3, 4A and 4B and still using FIG. 1 as a reference, it is noted that after placing the disk 13 on a smooth surface, the user may pivot the knob 15 within the limiting cutout 171 of the enclosure 17. Due to the inclination of the cutouts 152, the pull element 16 will move from the lowest position to the highest position of the cutouts 152, which lifts the extension 14. Because the extension 14 is formed on the center of the disk 13 such that the center of the disk 13 is pulled upward to the conical base 10. As a consequence, a vacuum is created inside the disk 13 to help the disk 13 to securely adhere to the surface.

As depicted in FIG. 3, the cap 12 is mounted on a top end of the hollow axle 11 so as to engage at least one of a plurality of the slits 23 defined along the inner face of each of the halves 21. The cap 12 is configured and dimensioned to be tightly received by the slits 23. The slits 23 are uniformly spaced and are formed along the height of the inner faces of the halves 21. The slits 23 represent height settings in which the cap 12 may engage.

Figure 5:
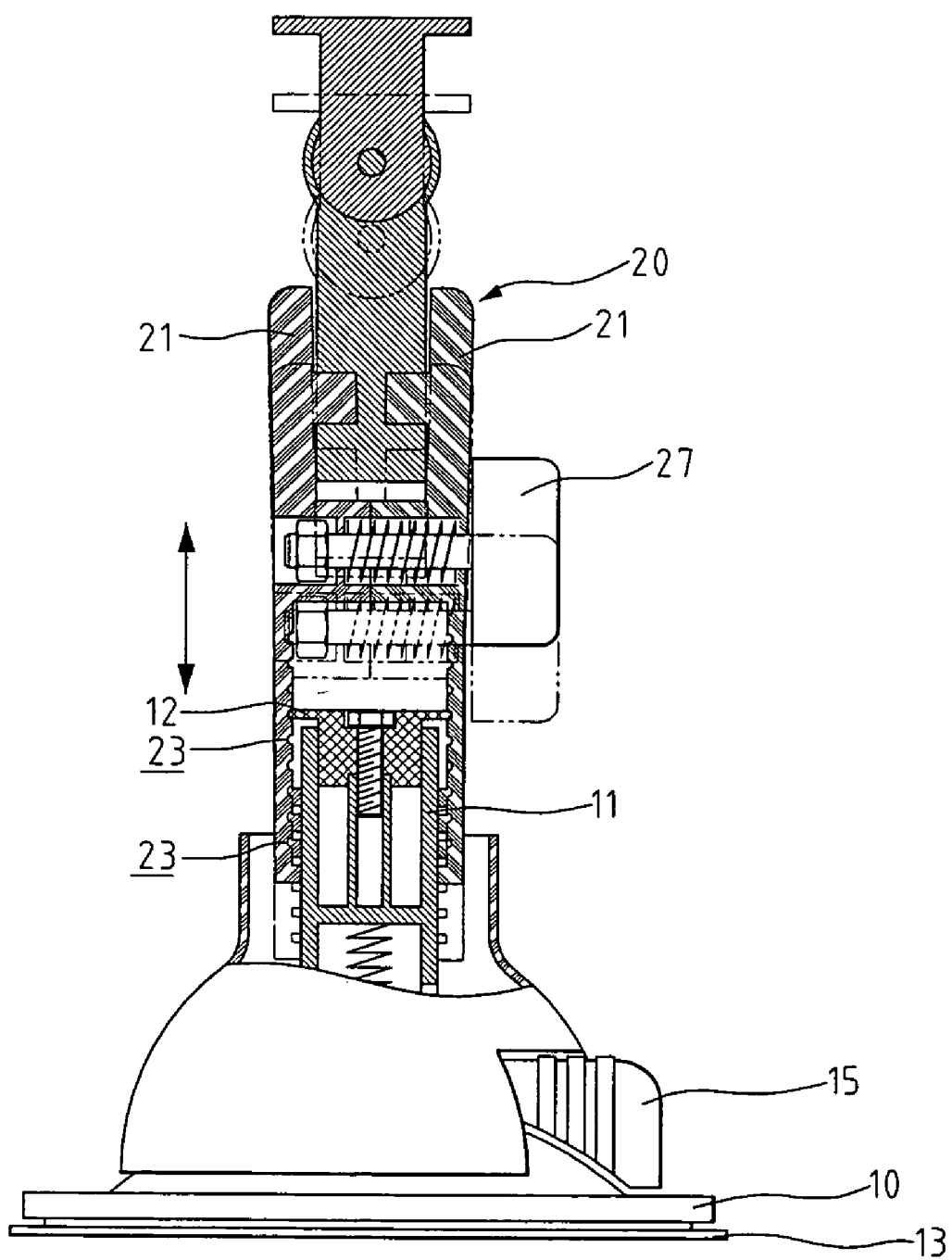
FIG. 5 is a cross sectional schematic view showing adjustment of the rod relative to the conical base.
Figure 6A:
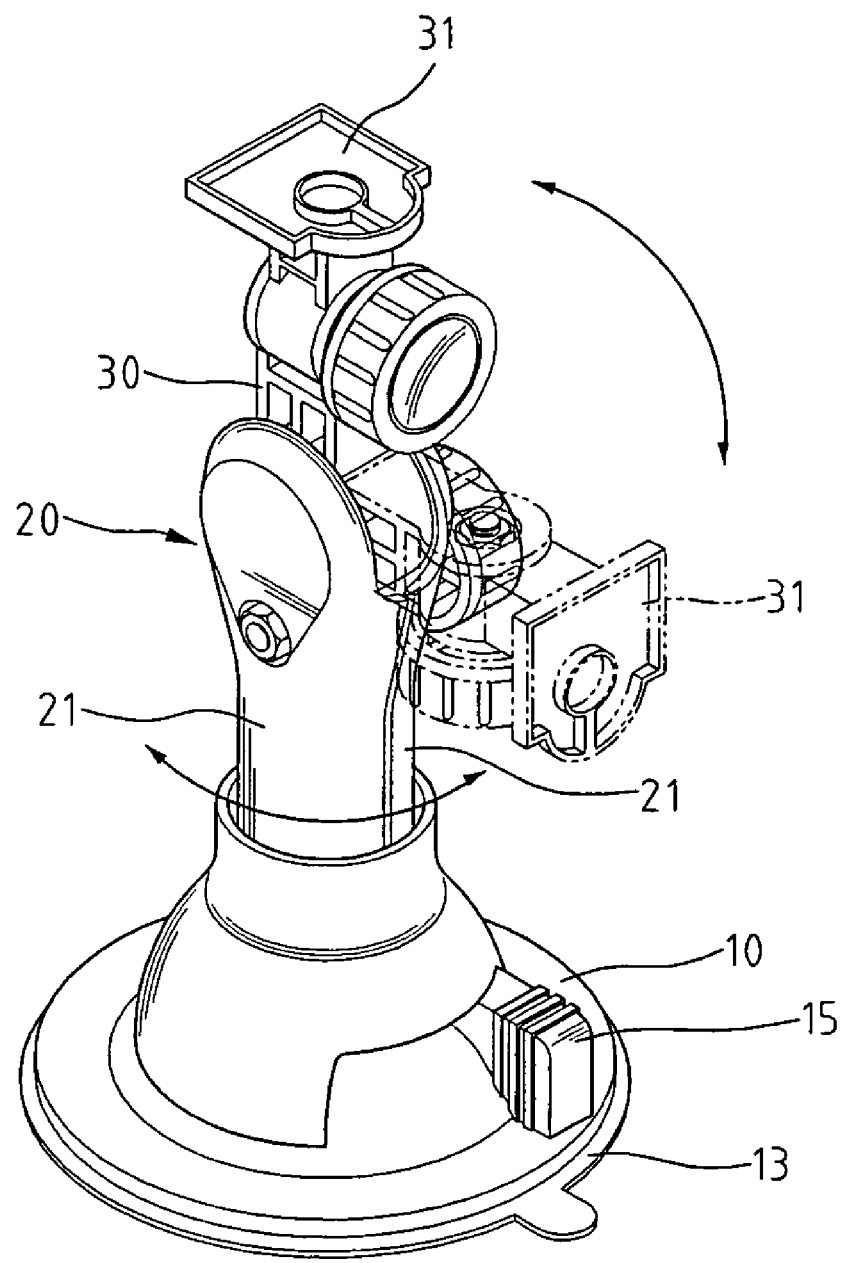
FIGS. 6A and 6B are cross sectional views showing the adjustment of the pivoting head relative to the rod to allow the user to have easy access to the communication device positioned at a suitable angle.
Figure 6B:
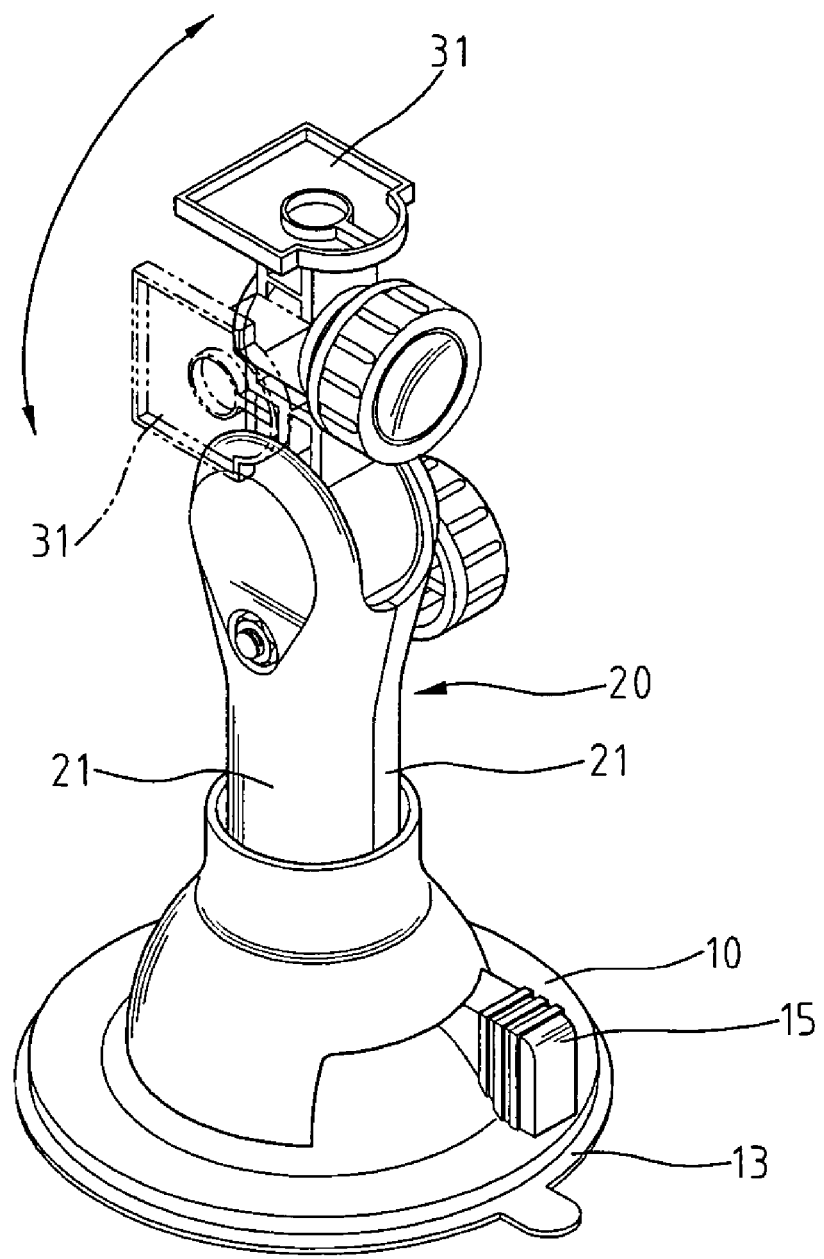

With reference to FIGS. 5, 6A and 6B, if the user is to adjust the angle of the rod 20 relative to the conical base 10, the user may loosen the nut 271 to slightly loosen the engagement between rib 111 of the hollow axle 11 and the latitudinal ribs 22 so that the user is able to rotate and extend the rod 20 relative to the conical base 10. Furthermore, loosening the nut 271 may also loosen the engagement between the first annular teeth 24 and the second annular teeth 33. Due to the second spring 28 mounted around the second bolt 27, the recovery force stored in the second spring 28 when the two halves 21 of the rod 20 are tightly engaged with each other will force the two halves 21 of the rod 20 away from one another so that the user may rotate the head 32 between the two halves 21 of the rod 20 to change the angle of the head 32 relative to the rod 20. Because the communication device (not shown) is securely attached to the seat 31, angle change of the head 32 relative to the rod 20 also changes the angle of the seat 31 relative to the rod 20. Therefore, it is noted that the not only the height of the fixture is changeable, but also the angle of the fixture is adjustable such that the user is able to easily implement the fixture in any smooth surface to hold the communication device.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fixture for holding a communication device, the fixture comprising:
    a conical base having a hollow axle extending upward from a face of the conical base;
    a disk movably connected to the conical base and having an extension extending from a center of the disk and through a bottom open end of the hollow axle;
    a disk lifting assembly mounted at a joint between the conical base and the hollow axle to lift the center of the disk so as to create a vacuum inside the disk to enable the disk to securely adhere to a surface;
    a rod movably engaged with the hollow axle and composed of two halves, each half having first annular teeth formed on an inner face of a top portion of the half;
    connecting elements to combine the two halves of the rod which can lock or loose the two halves and push away the two halves from each other to allow the rod to be movable relative to the hollow axle;
    a pivoting head pivotally sandwiched between the two halves of the rod for holding thereon the communication device; and
    a cap mounted on a top end of the hollow axle, the cap engaging at least one of a plurality of spaced slits formed along the height of the inner face defined by each of the halves.

2. The fixture as claimed in claim 1, wherein the disk lifting assembly comprises:
    a knob pivotal relative to the hollow axle and provided with a ring which is mounted around the hollow axle and having a pair of inclined cutouts defined in an upper periphery of the ring, a lowest positioning recess and an highest positioning recess respectively defined in two ends of each of the pair of inclined cutouts;

an elongated hole defined in the hollow axle; and a pull element extending through the elongated hole of the hollow axle and the extension of the disk such that the pivotal movement of the knob drives the ring to move along the hollow axle and the pull element is able to move inside the elongated hole of the hollow axle from the lowest position to the highest position along the inclined cutout of the ring, which lifts the center of the disk to create the vacuum inside the disk.

3. The fixture as in claim 2, in which the hollow axle has longitudinally formed ribs on an outer periphery of the hollow axle and each half of the rod has latitudinal teeth formed on an inner periphery of the half of the rod to correspond to the ribs so that after the two halves are combined together via a first bolt and nut combination, the latitudinal teeth are able to securely engage with the ribs to secure the rod to the hollow axle.

4. The fixture as in claim 1, in which the connecting elements to combine the two halves of the rod which can lock or loose the two halves and push away the two halves from each other to allow the rod to be movable relative to the hollow axle to adjust the high and the angle of the pivoting head.

5. The fixture as in claim 1, in which each half of the rod has first annular teeth formed on an inner periphery of a top portion of the half and the pivoting head has a second annular teeth formed on opposite sides of the pivoting head to correspond to the first annular teeth of each half of the rod so that the pivoting head is securely sandwiched between the two halves of the rod via the first bolt and nut combination and the rod is movable relative to the hollow axle when the first bolt and nut combination is loosened.

6. A fixture for holding a communication device, the fixture comprising:

a conical base having a hollow axle extending upward from a face of the conical base;

a disk movably connected to the conical base and having an extension extending from a center of the disk and through a bottom open end of the hollow axle;

a disk lifting assembly mounted at a joint between the conical base and the hollow axle to lift the center of the disk so as to create vacuum inside the disk to enable the disk to securely adhere a surface, wherein the disk lifting assembly comprises:

a knob pivotal relative to the hollow axle and provided with a ring which is mounted around the hollow axle and having a pair of inclined cutouts defined in an upper periphery of the ring, a lowest positioning recess and an highest positioning recess respectively defined in two ends of each of the pair of inclined cutouts;

an elongated hole defined in the hollow axle; and a pull element extending through the elongated hole of the hollow axle and the extension of the disk such that the pivotal movement of the knob drives the ring to move along the hollow axle and the pull element is able to move inside the elongated hole of the hollow axle from the lowest position to the highest position along the inclined cutout of the ring, which lifts the center of the disk to create the vacuum inside the disk;

a rod movably engaged with the hollow axle and composed of two halves, each half having first annular teeth formed on an inner face of a top portion of the half;

connecting elements to combine the two halves of the rod which can lock or loose the two halves and push away the two halves from each other to allow the rod to be movable relative to the hollow axle;

a pivoting head pivotally sandwiched between the two halves of the rod for holding thereon the communication device; and a cap mounted on a top end of the hollow axle, the cap engaging at least one of a plurality of spaced slits formed along the height of the inner face defined by each of the halves.

7. The fixture as in claim 6, in which the hollow axle has longitudinally formed ribs on an outer periphery of the hollow axle and each half of the rod has latitudinal teeth formed on an inner periphery of the half of the rod to correspond to the ribs so that after the two halves are combined together via a first bolt and nut combination, the latitudinal teeth are able to securely engage with the ribs to secure the rod to the hollow axle.

* * * * *